United States Patent [19]
Ritzl et al.

[11] Patent Number: 5,339,745
[45] Date of Patent: Aug. 23, 1994

[54] SOUND PROOFING AND VIBRATION DAMPENING ELASTIC CONNECTING ELEMENT

[75] Inventors: Antal Ritzl, Zürich; Markus Wernli, Winterthur, both of Switzerland

[73] Assignee: Alusuisse-Lonza Services Ltd., Zurich, Switzerland

[21] Appl. No.: 69,786

[22] Filed: Jun. 1, 1993

[30] Foreign Application Priority Data

Jun. 24, 1992 [CH] Switzerland .................. 1987/92

[51] Int. Cl.$^5$ .......................................... B61D 17/00
[52] U.S. Cl. ........................................ 105/452; 105/422
[58] Field of Search ............... 105/375, 422, 423, 452, 105/453; 296/193; 52/393, 402, 403

[56] References Cited

U.S. PATENT DOCUMENTS

| 194,580 | 8/1877 | Clark | 105/375 |
| 1,302,578 | 5/1919 | Murphy | 52/481 |
| 2,019,052 | 10/1935 | Lord | 105/422 |
| 2,115,238 | 4/1938 | Stevens | 52/480 |

FOREIGN PATENT DOCUMENTS

| 0016469 | 10/1980 | European Pat. Off. . | |
| 2908823 | 9/1980 | Fed. Rep. of Germany . | |
| 0151722 | 11/1981 | Fed. Rep. of Germany | 105/375 |
| 8814439 | 3/1990 | Fed. Rep. of Germany . | |
| 0284846 | 11/1990 | Fed. Rep. of Germany | 105/422 |
| 0288130 | 3/1991 | Fed. Rep. of Germany | 105/422 |
| 9209468 | 6/1992 | PCT Int'l Appl. | 105/422 |

*Primary Examiner*—Mark T. Le
*Attorney, Agent, or Firm*—Bachman & LaPointe

[57] ABSTRACT

A sound proofing and vibration dampening connecting element (B) for floating suspension of a floor-deck on a structural, load-bearing carriage floor of railway vehicles for passenger transport features a base section (28) that is U-shaped in cross-section and, projecting partly over this, a deck-supporting section (38) that is U-shaped in cross-section with base strips (30, 40) having flanges (32, 42) projecting perpendicularly from them. Between the pairs of facing flanges (32, 42) and adhesively bonded to them are elastic profiled strips (46) that, along with base strips (30, 40) forming the contact surfaces for the carriage floor (26) and floor-deck (27), delimit a hollow space (47).

19 Claims, 5 Drawing Sheets

5,339,745

SOUND PROOFING AND VIBRATION DAMPENING ELASTIC CONNECTING ELEMENT

BACKGROUND OF THE INVENTION

The invention relates to a sound proofing and vibration dampening elastic connecting element for floating suspension of the floor-deck of a load-bearing floor of road or railway vehicles used for passenger transport, said element having an elastic body and contact surfaces for the vehicle floor and floor-deck.

Passenger space in railway vehicles has to be thermally and accoustically insulated in order to provide increased comfort for those travelling in the vehicle. Particularly important in that respect is the insulation of the floor-deck from the load-bearing structural floor, as the greatest noise comes from the wheel suspension below the structural floor. Furthermore, the floor-deck should exhibit some elasticity.

A known means of providing floating suspension for the floor-deck in passenger vehicles is to provide rubber elements between the floor-deck and the vehicle floor. Monolithic rubber blocks, however, suffer the disadvantage that a hardening of the rubber blocks that arises with increasing load due to the effect of compression, reduces the sound-proofing and vibration dampening properties.

In awareness of this state-of-the-art, it is the object of the present invention to provide a joining element that, also under elevated load conditions, exhibits good behavior with respect to sound-proofing and vibration dampening.

SUMMARY OF THE INVENTION

This object is achieved by way of the invention in that the connecting element features a base section having a contact surface for the structural floor and a deck-supporting section that is displaced in height with respect to the base section and has a contact surface for the floor-deck and pairwise-facing, load-bearing surfaces that run essentially perpendicular to the carriage floor and deck and feature between them elastic masses that are also bonded to them, whereby the free surfaces of the base section and/or the deck-supporting section have an adherent layer or thin sheet of sound proofing material on them.

The load-bearing surfaces can be inclined by up to 20° to the vertical direction.

In a preferred version the connecting element features a base section that is U-shaped in cross-section and, projecting partially over it, a deck-supporting section that is U-shaped and has a base strip with flanges projecting perpendicularly from it. Between the pairs of facing flanges and adhesively bonded to them are profiled elastic strips that, along with the base strips forming the contact surfaces for the carnage floor and floor-deck, delimit a hollow space. Between the elastic profiled strips and joining them inside the hollow space is a layer or thin sheet of sound proofing material that is bonded to at least one of the base strips.

The base section and the deck-supporting section can basically be of two different kinds and such that in one case the free ends of the flanges of the base section point away from the base strip of the deck-supporting section and in the other case the free ends of the flanges of the base section are positioned opposite the base strip of the deck-supporting section. In order to support the elastic profiled strips, longitudinal struts can be provided on the flanges of the base section parallel to the base strip and pointing outwards. These longitudinal struts are, corresponding to the arrangement of the base section with respect to the deck-supporting section, either provided at the free ends of the flanges or approximately as an extension of the base strip of the base section.

A preferred possibility for installation of the connecting element with base and deck-supporting sections pointing in the same direction is such that the base strip of the base section, lying as in the installed connecting element, rests on a pair of struts that are T-shaped in cross-section and project upwards from the structural carriage floor, whereby the base strip features at the center along its length a groove-shaped depression that projects down between the struts. A suitable means for to insure forced-fit locking of the base section to the carriage floor is a clamping element that fits over the the base strip at the depression and is braced against the struts of the base section.

The base section and the deck-supporting section are usefully of extruded aluminum. The elastic profiled strips and the layer or thin sheet joining them can be of natural caoutchouc or similar materials. The elastic parts are usefully vulcanized onto the flanges and base strips.

The connecting element according to the invention exibits excellent behavior with respect to thermal insulation, sound proofing and vibration dampening.

The thermal insulation is provided by the elastic profiled strips that separate the base section from the deck-supporting section. Also in the fully compressed condition the thermal insulation is assured by the intermediate layer or thin sheet of sound proofing material.

In the connecting element according to the invention the sound proofing is achieved in several stages. First the noise from the carriage floor is transmitted to the base section and can for example be slightly dampened by provision of a double-sided adhesive strip. The sound deflected via the profiled strips and passed into the deck-supporting section is reduced by the profiled strips themselves and if necessary further by an additional double-sided adhesive strip provided between the deck-supporting section and the deck. A last means of sound proofing takes place then in the deck. The sound eminating from the base section and transmitted through the air is likewise diminished by the layer or thin sheet of sound proofing material before it enters the the deck-supporting section. In all, therefore, extremely effective sound proofing is achieved.

With the arrangement of elastic mass and sound proofing layer according to the invention both good vibration dampening and sound proofing are achieved along with pleasant, soft walking conditions for the passangers. These advantages over monolithic rubber insulating elements are achieved by the arrangement according to the invention of the elastic mass in such a way that under compression shear forces instead of purely compressive forces, as a result of which under load only slight hardening of the elastic mass occurs, and by the sound proofing effect of the layer of sound proofing material on the free surfaces of the base section and/or deck-supporting section.

BRIEF DESCRIPTION OF THE DRAWINGS

Further advantages, features and details of the invention are revealed in the following description of preferred exemplified embodiments and via the drawing, which shows in FIG. 1: a perspective view of a sectioned carriage structure.

Figure 1:
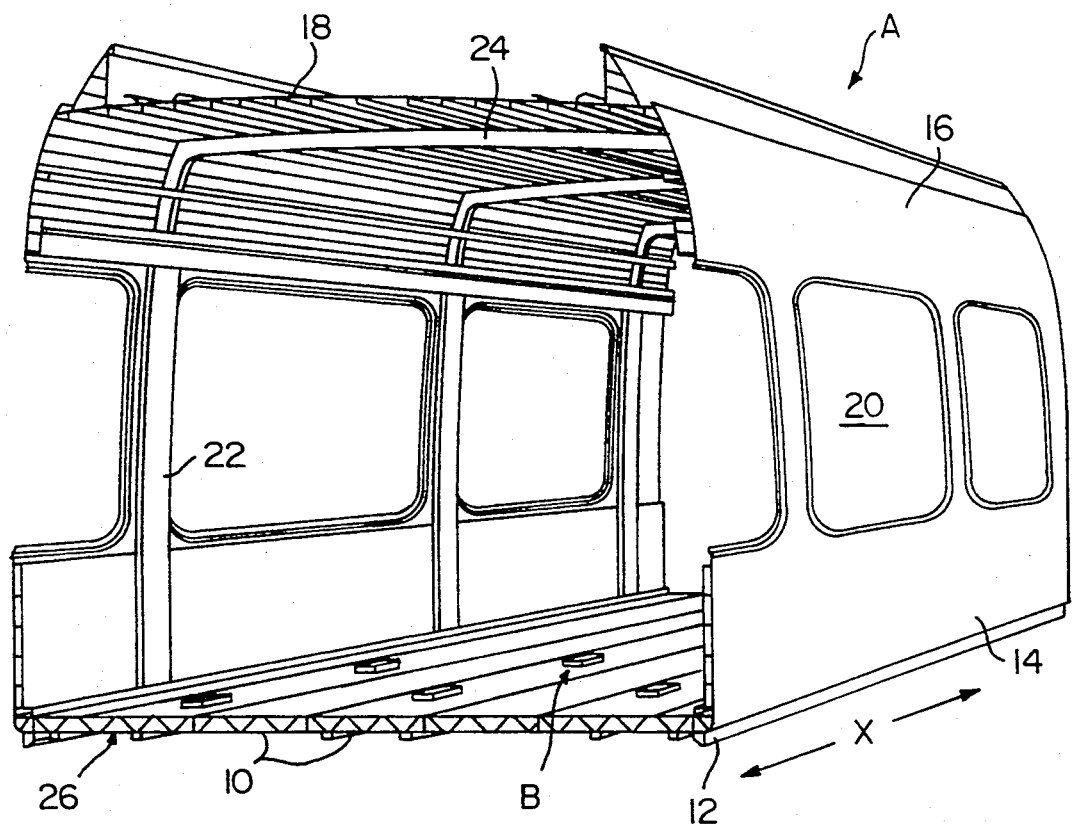

A carriage superstructure A conceived for railway passenger transport comprises, as shown in FIG. 1, wide aluminum extrusions that have been welded together, lengthwise, in the longitudinal direction x of the vehicle; the most important structural members are the floor sections 10, the lower edge sections 12, the sidewall sections 14, the roof edge sections 16 and the roof sections 18. Further structural members are the posts 22 delimiting the windows 20 and running transverse to the longitudinal direction of the vehicle, and the roof struts 24.

Figure 3:
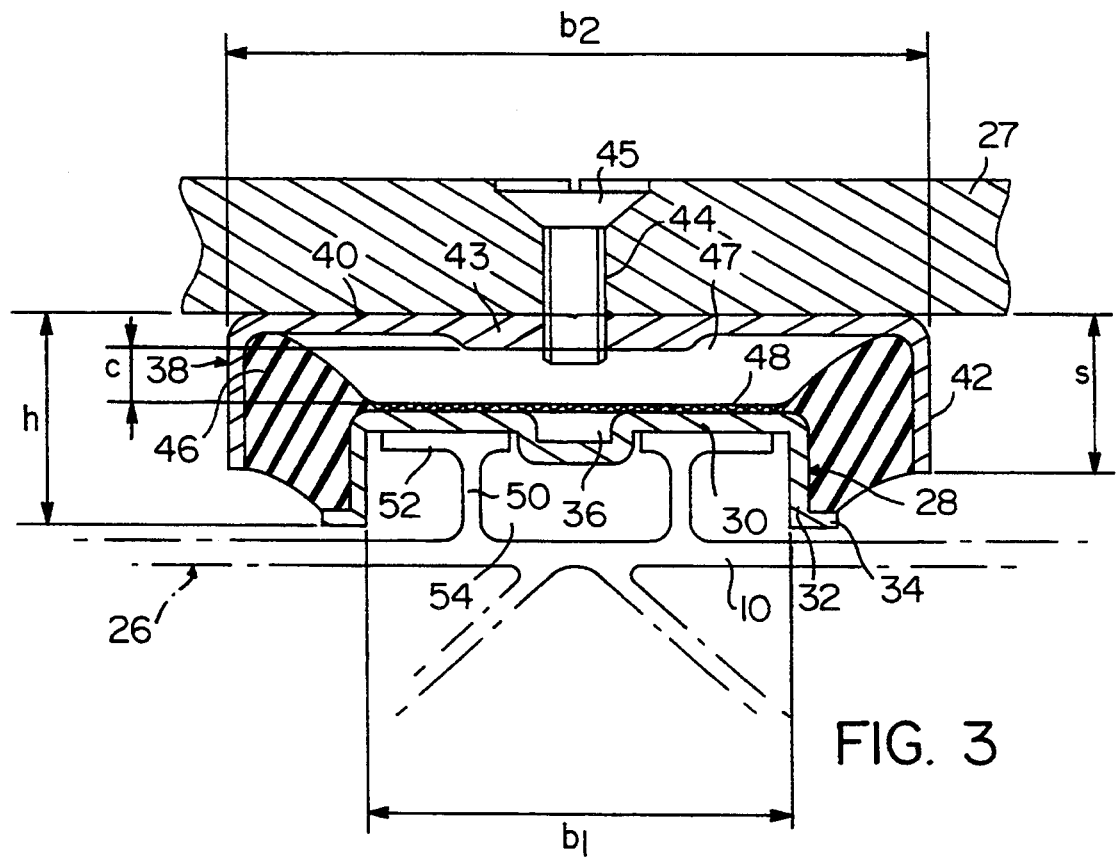
FIG. 3: a cross-section through the connecting element shown in FIG. 2.

The multi-chamber hollow floor sections 10 that are welded together longitudinally form the structural floor 26 of the carriage, on the upper side of which connecting elements B are arranged as supporting elements for a floating floor-deck 27 that can be walled on, but for reasons of clarity is not shown here, but see for example FIG. 3. The number and distribution of the individual connecting elements B over the whole floor 26 depend on the load to be borne by the floor-deck 27.

Figure 2:
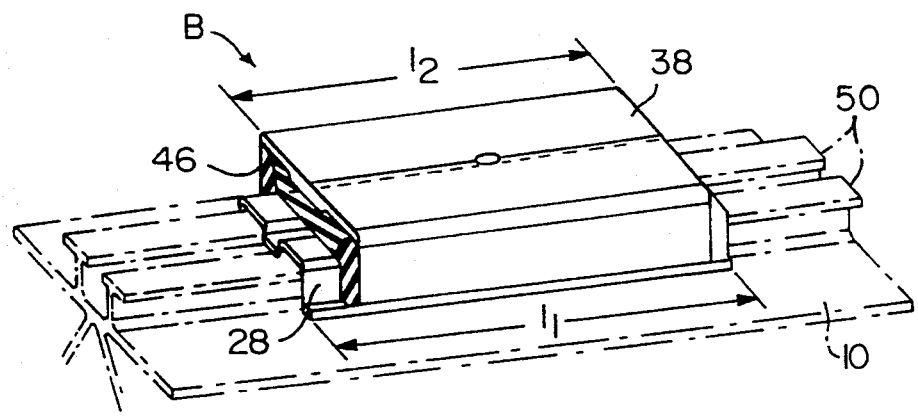
FIG. 2: a perspective view of a connecting element.

The connecting element B shown in FIGS. 2 and 3 features a section 28 that is U-shaped in cross-section, has a length $l_1$ of, for example, 120 mm and breadth $b_1$ of, for example, 60 mm. The base section 28 comprises a base strip 30 with, projecting vertically from it, side flanges 32, from the free ends of which narrow longitudinal struts 34 project out parallel to the base strip 30. In the base strip 30, running along the middle, longitudinally, is a groove-shaped depression 36. Projecting partly over the base section 28 is a deck-supporting section 38 that is likewise U-shaped in cross-section and, anologous to the base section 28, features a base strip 40 with flanges 42 projecting vertically from it that, on installation, point towards the floor of the carriage and the base strips 30, 40; the flanges 32, 42 on the base section 28 and deck-supporting section 38 run parallel to each other with a distance between them. The deck-supporting section 38 is of length $l_2$, for example, 100 mm and breadth $b_2$, for example, 90 mm. The length s of the flange 42 on the deck-supporting section 38 is, for example, 20 mm for an installation height h of joining element B of, for example, 27 mm. The base strip 40 is thicker in the central region 43 and features a threaded hole 44 for a bolt 45 in order to enable it to be bolted to the treadable floor-deck 27 The threaded hole 44 with bolt 45 in place lies in line with the depression 36 in the base strip 30 of base section 28.

Base section 28 and deck-supporting section 38 are normally extruded aluminum sections; in principle, however, other metal or plastic sections can also be used.

An elastic strip 46, here of natural caoutchouc with a shore hardness of 70 SH units, is provided between each of the pairs of opposite lying flanges 32, 42 of the base section 28 and deck-supporting section 38 resp. The elastic strips 46 vulcanized to the flanges 32, 42 are also supported in the space between the base strip 40 and flanges 42 of the deck-supporting section 38 and the longitudinal struts 34 on the flanges 32 of base section 28 and delimit a space 47.

The pair of elastic, profiled strips 46 are joined together via a layer or thin sheet 48 of the same or another mass of sound insulating material such as natural caoutchouc, plastic, foamed material etc. vulcanized to the base strip 30 of the base section.

Under load, the deck-supporting section 38 is depressed over the base section, whereby the maximum distance c for a spring action is given by the distance between the base strips 30, 40 and for example amounts to 7 mm.

The joining element B shown in FIGS. 2 and 3 by virtue of the shape of its base section 28, is designed to accommodate a standard carriage floor section 10 with pairs of upward projecting struts 50 that are T-shaped in cross-section; the flanges 52 at the top of the struts 50 form the contact support surfaces for the base strip 30 of base section 28. Between the pairs of struts 50 is an undercut recess 54, into which the depression 36 in the base strip 30 projects.

Figure 4:
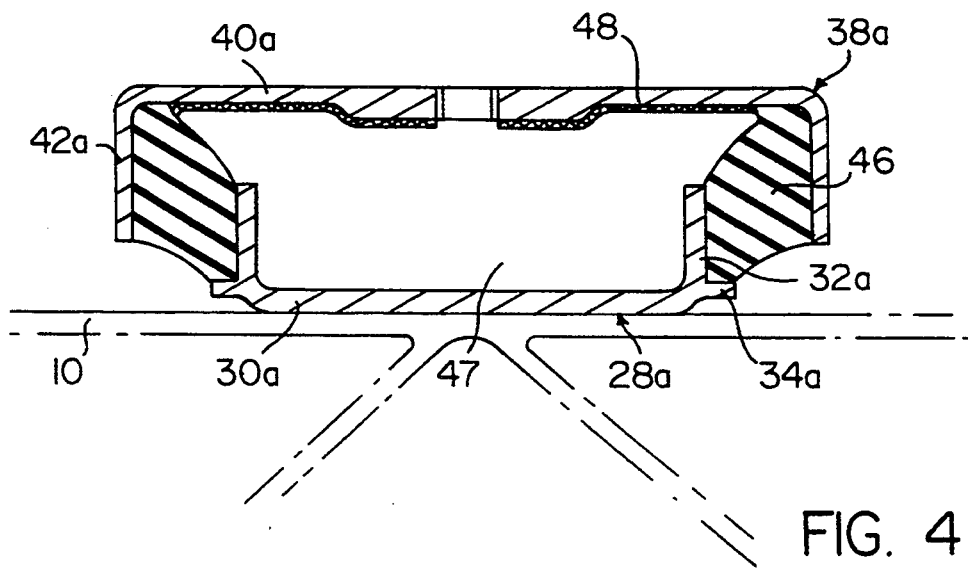
FIG. 4: a cross-section through another version of a connecting element.

In a further version of the connecting joint B, shown in FIG. 4, the open side of the base section 28a faces the open side of the deck-supporting section 38a, i.e. the flanges 42a of the deck-supporting section 38a project over the free ends of the flanges 32a of base section 28a, the base strip 30a of which rests directly on the carriage floor section 10. The narrow longitudinal struts 34a project here out from the flanges 32a approximately as an extension of the base strip 30a. In this version of the joining element B the layer or thin strip 48 joining the elastic profiled strips 46 lies on the inner face of the base strip 40a.

Figure 5:
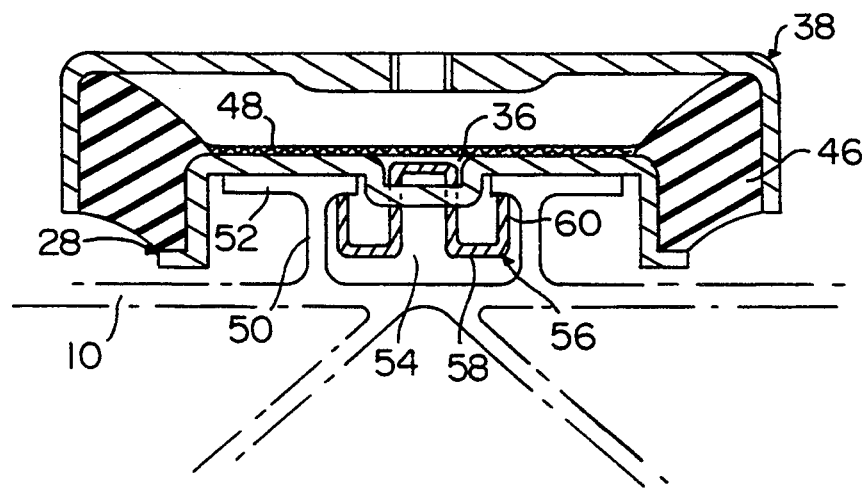
FIG. 5: The connecting element in FIG. 3 with inserted clamping piece.
Figure 6:
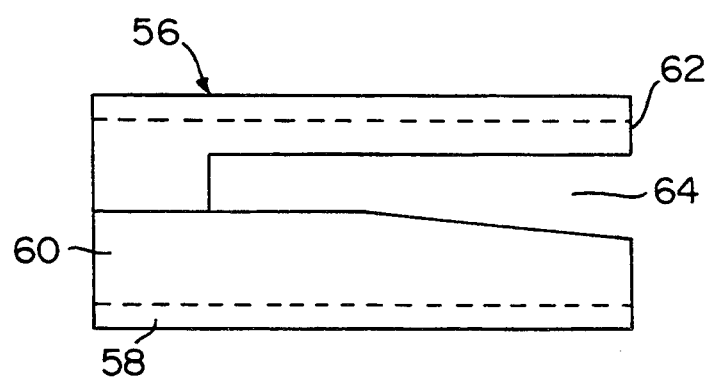
FIG. 6: an enlarged, longitudunal cross-section of the clamping piece in FIG. 5.

A simple clamping element for force-fit locking connecting element B in FIGS. 2 and 3 to the carriage floor section 10 is illustrated in FIGS. 5 and 6 and comprises a clamp 56 that is for example of aluminum or plastic, is essentially U-shaped in cross-section, and has flanges 58 that are twice inclined at right angles and terminate in end strips 60. The clamp 56 features a wedge-shaped slit 64 running from the front face 62. To secure the connecting element B to the carriage base section 10, the element B is laid on the section struts 50 and a clamp inserted on one or both sides in such a way that the base strip 30 of the base section 28 is engaged in the slit 64 at the depression 36, and the ends of strips 60 are braced against flange 52 inside the longitudinal channel 54.

The manner of forced-fit locking the floor deck 27 to the base strip 40 of the deck support section 38 and the base strip 30 to the T- shaped flange 52 and the carriage floor section 10 depends on the required joint strength and on the materials to be joined. The base section 28 which is longer than the deck-supporting section 38 permits various forms of attachment. Joining materials that come into consideration are adhesives, double-sided adhesive strip, interlocking, welded, riveted, clamped and bolted joints or corresponding combinations thereof. Preferred are interlocking means e.g. in the form of strips with a hooking side and a catching side. One side can be secured to the floor deck 27, or T-shaped beam 52, or carriage floor section 10 for example by adhesive means and the other side in the same position on the base strip 40, 40a of the deck-supporting section 38, 38a, or on the base strip 30, 30a e.g. by adhesive means. Such interlocking joints are readily releasable.

Figure 7:
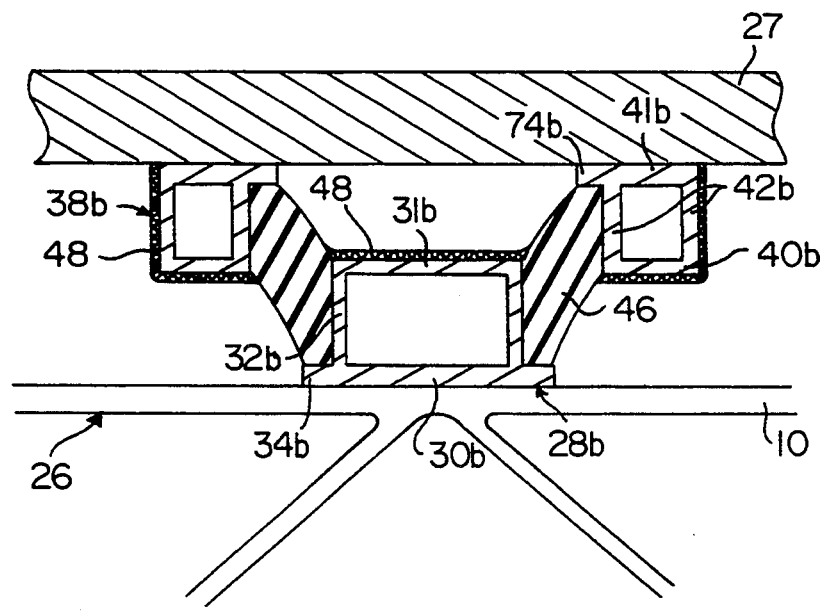
FIG. 7: a cross-section of a connecting element with hollow sections.

FIG. 7 shows a connecting element with base section 28b whose cross-section is in the form of a rectangular hollow section having a base strip 30b, a top strip 31b, and side strips 32b. Here the narrow longitudinal struts 34b project out from the sides 32b as an extension to the base 30b. The deck-supporting section 38b is formed by two hollow sections that run parallel to each other, are rectangular in cross-section and feature base strips 40b, top strips 41b and sidewall strips 42b. Projecting out from the sidewalls 42b are narrow longitudinal struts 74b as extensions to the top strips 41b. The elastic profiled strips 46 are situated between the opposite lying, parallel sidewall strips 32b and 42b. The layer 48 of sound proofing material lies on top strip 31b, on base strips 40b and on the free sidewall strips 42b.

Figure 8:
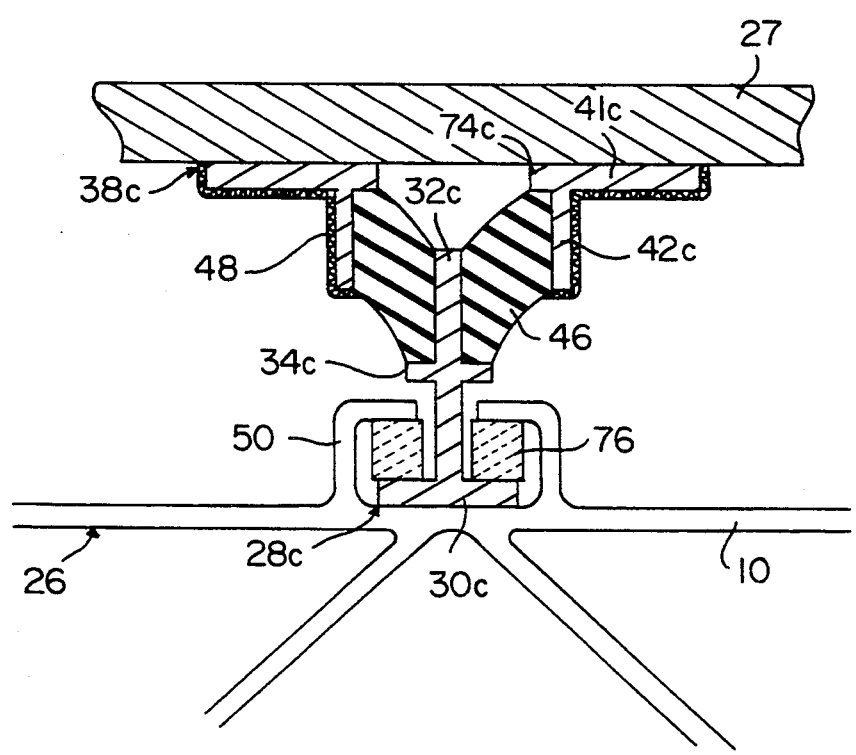
FIG. 8: a cross-section through a connecting element with T-shaped base section.

FIG. 8 shows a connecting element having a base section 28c that is T-shaped in cross-section. Here the central flange 32c features on each side a support for the elastic profiled section 46. The base strip 30c of the base section 28c lies between the struts 50 of the carriage floor section 26 and is held forceably in place by means of wedgeing elements 76. The narrow longitudinal struts 34c are situated on both sides of the central flange 32c. The deck-supporting section 38c is formed by two mirror image sections that are L-shaped in cross-section with vertical flanges 42c running parallel to the central flange 32c and horizontal flanges 41c projecting outwards. A narrow longitudinal strut 74c: projects inwards as an extension of the horizontal flanges 41c.

The elastic profiled strips 46 are situated between the vertical flanges 42c and the central flange 32c. The layer 48 of sound proofing material is adhesively bonded to the free surfaces of the deck-supporting section 38c.

Figure 9:
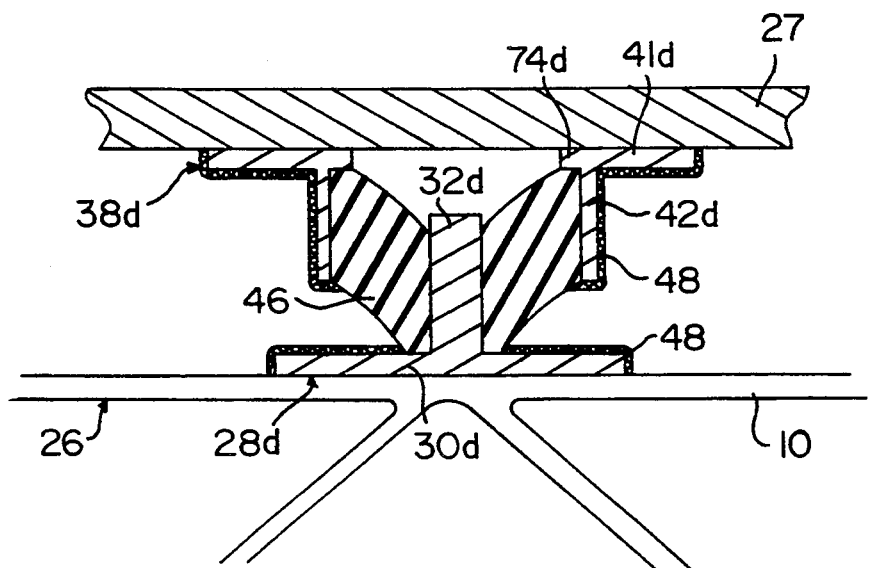
FIG. 9: a cross-section through a plate-shaped connecting element.
Figure 10:
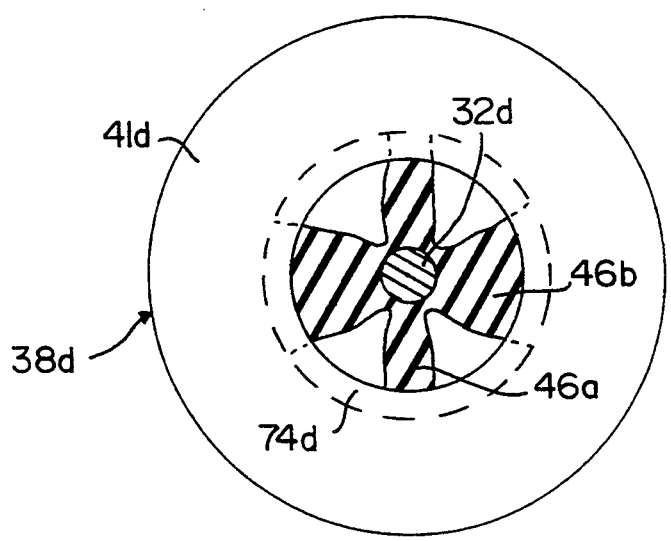
FIG. 10: the plan view of the plate-shaped connecting element in FIG. 9.

Illustrated in FIGS. 9 and 10 is a plate-shaped version of a connecting element. The base section 28d is in the form of a disc-shaped base plate 30d with a central, vertical projecting rod 32d. The deck-supporting section 38d, which is concentric to the base section 28d, is L-shaped in cross-section with flange 42d lying parallel to the axis i of rod 32d and circular, ring-shaped flange 41d that lies parallel to the base plate 30d at right angles to the vertical rod 32d. A narrow, ring shaped strut 74d on the flange 42d projects inwards as an extension of the cover flange 41d. Two pairs of elastic bodies 46a,b, of different dimensions and at right angles to each other, are provided between the surface of the central rod 32d and the ring-shaped flange 42d. The layer 48 of sound proofing material lies on the free surfaces of the deck-supporting section 38d and the base plate 30d. As a result of their difference in thickness the elastic bodies 46a,b exhibit different degrees of rigidity in two directions, e.g. in the longitudinal and transverse directions of the carriage.

We claim:

1. Connecting element which comprises: a sound proofing and vibration dampening elastic connecting element for floating suspension of a floor deck on a structural load-bearing carriage floor of vehicles for passenger transport, having an elastic body with supporting surfaces for the carriage floor and the floor-deck, wherein the floor-deck is spaced above said carriage floor; a base section of said connecting element having free surfaces and a surface for contact with the carriage floor; a deck-supporting section of said connecting element having free surfaces spaced from the free surfaces of the base section and a surface for contact with the floor-deck spaced from the surface for contact with the carriage floor of the base section; counterfacing surfaces of said base section and deck-supporting section spaced from each other running essentially perpendicular to the carriage floor and floor-deck; and an elastic mass between the counterfacing surfaces and adhesively bonded thereto, wherein a sound proofing material is present on the free surfaces of at least one of the base section and deck-supporting section and is adhesively bonded thereto.

2. Connecting element according to claim 1 wherein said counterfacing surfaces are pairwise counterfacing surfaces, and wherein said carriage floor is displaced in height with respect to the base section.

3. Connecting element according to claim 1 wherein the counterfacing surfaces are inclined to the vertical direction by at most 20°.

4. Connecting element according to claim 2 wherein the connecting element includes a base section that is U-shaped in cross-section, a deck-supporting section that is U-shaped in cross-section projecting partly over said base section, said base section and deck supporting section having base strips spaced from each other from which pairs of flanges project perpendicularly and face each other, elastic profiled strips between the pairs of facing flanges and bonded thereto, wherein the base strips delimit a hollow space, said sound proofing material joining the profiled strips and adhesively bonded to at least one of the base strips, and wherein said base strips form the contact surfaces for the carriage floor and floor-deck.

5. Connecting element according to claim 4 wherein free ends of the flanges of the base section point away from the base strip of the deck-supporting section.

6. Connecting element according to claim 5 wherein longitudinal struts are provided at the free ends of the flanges on the base section running parallel to the base strip and pointing outwards.

7. Connecting element according to claim 4 wherein the free ends of the flanges on the base section face the base strip of the deck-supporting section.

8. Connecting element according to claim 7 wherein longitudinal struts project from the flanges of the base section approximately as extensions of the base strip.

9. Connecting element according to claim 5 wherein the base strip of the base section rests on a pair of profiled struts that are T-shaped in cross-section and project up from the carriage floor.

10. Connecting element according to claim 9 wherein the base strip of the base section includes between the profiled struts a central groove-shaped depression that runs lengthwise.

11. Connecting element according to claim 10 wherein, for the purpose of forced-fit locking the base section to the carriage floor, the base strip is engaged at the groove-shaped depression by a clamping element that is braced against the profiled struts.

12. Connecting element according to claim 7 wherein the base strip of the base section rests directly on the carriage floor.

13. Connecting element according to claim 1 wherein the base section and the deck-supporting section are of extruded aluminum.

14. Connecting element according to claim 1 wherein said elastic mass and sound proofing material are of natural caoutchouc material.

15. Connecting element according to claim 1 wherein said elastic mass and sound proofing material are vulcanized onto said connecting element.

16. Connecting element according to claim 14 including at least two of said elastic masses, and wherein the elastic masses exhibit different degrees of rigidity.

17. Connecting element according to claim 15 including at least two of said elastic masses, and wherein the elastic masses exhibit different degrees of rigidity.

18. Connecting element according to claim 1 wherein said connecting element is for floating suspension of a floor deck on a structural load-bearing carriage floor of a vehicle selected from the group consisting of road vehicles and railway vehicles.

19. Connecting element according to claim 1 wherein said sound proofing material is selected from the group consisting of a layer of sound proofing material and a thin sheet of sound proofing material.

* * * * *